Aug. 11, 1959     R. ABRAMS     2,899,220

ADJUSTABLE ASSEMBLY

Filed Jan. 3, 1955

Inventor
Ralph Abrams
by Roberts, Cushman + Grover
Attys

United States Patent Office 2,899,220
Patented Aug. 11, 1959

2,899,220

ADJUSTABLE ASSEMBLY

Ralph Abrams, Sharon, Mass., assignor to Cambridge Thermionic Corporation, Cambridge, Mass., a corporation of Massachusetts Application January 3, 1955, Serial No. 479,615

3 Claims. (Cl. 287—20)

This invention relates to mounting devices which permit precise relative adjustment of two components and inherent maintenance of such adjustment; in a preferred embodiment, it is related to an adjustable mount for the components of electrical reactance apparatus.

The principal object of the invention is to provide for exact relative adjustment of an assembly of apparatus parts and for fixing the relative location of such parts at a seletced position of adjustment so that they will not move relatively to each other, without danger of change of position by reason of unintentional or accidental causes such as mechanical vibrations or shock, while providing for easy and permanent adjustment of the parts when the assembly is mounted. Other objects are to provide an adjustable assembly which can be mounted on a supporting structure without affecting the position of the relatively adjustable components, and to provide such an assembly which does not require loose parts and thus promotes speed and certainty in mounting and using the device. A further object is to provide a mount of this type which can be manufactured from comparatively inexpensive and easily machined material without special high precision and complicated tools, and especially to provide such a mount that is well adapted to inexpensive automatic machine production, which has a minimum number of parts and which can be assembled by relatively unskilled workers. An additional important object of the invention is to provide for adjustment of the components of an electrical reactance device for the purpose of securing permanent accuracy of position for the most efficient operation of apparatus incorporating such devices, such as tracking circuits.

The following summary indicates the nature and substance of the invention, for attaining the above objects.

The mount according to the invention has a hollow stud and a screw spindle threaded therethrough with its ends projecting from the opposite ends of the stud and movable longitudinally in the stud by rotation. One component of the assembly can be fixed on the stud near one end and the other component can be mounted on one end of the screw adjacent the component on the stud, whereas the other end of the screw can be shaped to receive a tool. This assembly has the characteristic feature that the stud is split at the end from which the shaped end of the screw projects and carries at that end a constrictor that pinches the stud about the screw threaded through it, thereby fixing the screw in a given position of adjustment while permitting such adjustment.

In the preferred embodiment herein described and according to an important aspect of the invention, the constrictor is an elastic ring or band of spring metal and the stud has an exterior groove or neck within which the constrictor is seated. The constrictor ring is also split to provide the spring action and to facilitate mounting on the stud. For the latter purpose, the end portion of the stud is tapered to ease the thrusting of the constrictor onto the stud and into its groove. Opposite the split end, the stud can have an annular shoulder and an exterior thread for a nut which in cooperation with the shoulder is adapted to secure the mount on a panel or similar supporting structure, the inside diameter of the nut exceeding the maximum diameter of spring and taper so that the assembly can be mounted or removed without affecting the adjustment of the assembly.

In accordance with another important aspect of the invention, the mounting for the component that is carried by the hollow stud can be a sleeve fastened to the stud and having on its exterior the one component and containing the other component carried by the screw, which is movable relatively thereto by rotation of the screw. As herein illustrated the component mounted on the sleeve is a coil and that within the sleeve is a core fixed to the screw. The end of the screw opposite the movable component, here the core, projects from the stud and is flattened or otherwise shaped so that it may be grasped by an appropriate tool for turning the screw to effect relative movement between the components.

These and other objects and aspects of novelty of the invention will appear from the following description of a typical embodiment illustrating its novel characteristics. This description refers to a drawing in which Fig. 1 is an elevation of a trimming inductor that is assembled and mounted according to the invention;

Figure 1:
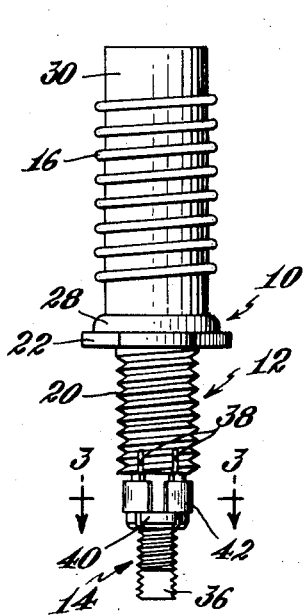

The trimmer mount 10 has as supporting elements a hollow stud 12 and a screw spindle 14 threaded into the stud for longitudinal movement therein. The stud carries one component of an impedance for example a coil 16, and the screw the other component for example a core 18 so that by rotation of the screw the components can be adjusted relative to each other.

Figure 2:
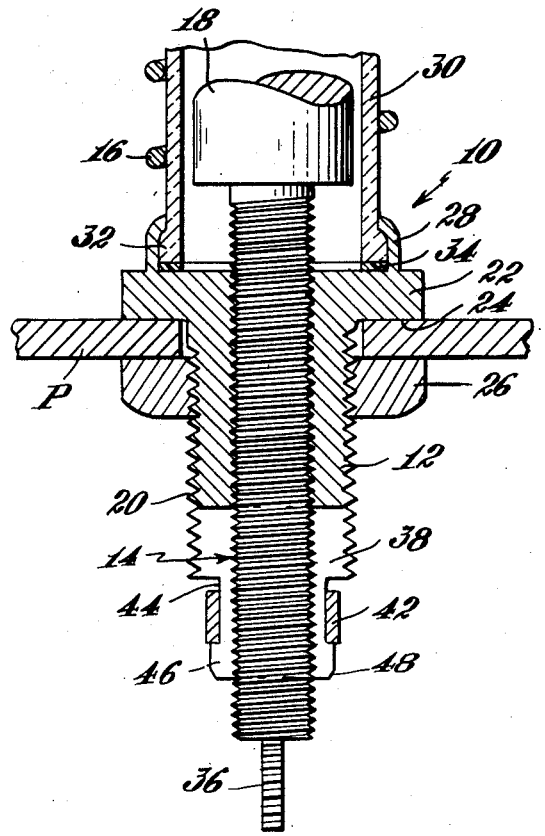
Fig. 2 is an axial cross section taken to larger scale of the lower part of the trimmer shown in Fig. 1.

The stud has a barrel 20 which is externally threaded and has at one end a flat flange 22 forming a radial shoulder 24 at its junction with the threaded barrel, so that by means of a nut 26 applied to the barrel the mount can be fixed to a panel p, as shown in Fig. 2. The flange 22 has opposite to the shoulder 24 an extension in the form of an annular, deformable collar 28, and an insulating sleeve-like support 30 with a lip 32 that is fitted into the collar 28 against the flange and crimped therein by deformation of the rim of the flange. A soft washer 34 can be placed between the sleeve and the flange to prevent chipping or other damage to the sleeve. As herein illustrated a ceramic sleeve is employed, but it is to be understood that any material of good dielectric properties may be substituted therefor, for example, paperboard, extruded plastic, rubber, or glass so long as it has the required characteristics of strength and dielectric properties.

The stud is made of metal, for example brass plated with cadmium. It is to be understood however that aluminum and other metals may be employed which are readily machinable.

The screw 14 is long enough so that its opposite ends project from the opposite ends of the stud 20, one end projecting into the sleeve and having integral with it or fastened thereto the internal component 18 of the impedance. The opposite end of the screw is flattened to provide a face 36 which may be grasped for turning the screw. The screw is preferably iron or phosphorous bronze but like the stud, can be made of any of the common alloys of aluminum, brass or the like which can be readily machined.

The components of the impedance herein illustrated are the coil 16 wound on the exterior wall of the sleeve 30 and the above mentioned iron core 18 fixed to or formed integral with the screw 14. The capacitive or inductive reactance of the impedance can be adjusted by relative movement of the coil and core which in turn is effected by rotation of the screw 14 within the stud 20.

Figure 3:
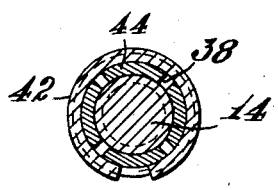
Fig. 3 is a diametrical cross section taken on the line 3—3 of Fig. 1.
Figure 4:
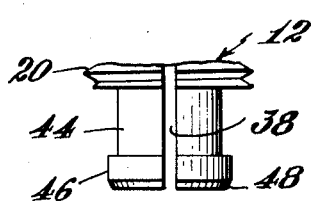
Fig. 4 is a fragmentary elevation of the split end of the stud without the screw.
Figure 5:
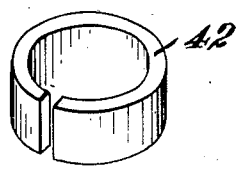
Fig. 5 is an isometric view of the constrictor ring.

In order to secure exact adjustment of the components of the reactance device, herein shown as a coil 16 and core 18, without danger of the parts getting out of adjustment through vibration while permitting forcible adjustment, and without requiring a high degree of accuracy in machining the screw threaded parts namely the threaded stud and the threaded screw, that flattened portion of the stud from which the socket of the screw extends is split in accordance with the invention, and a constrictor is applied thereto which pinches the stud on the screw thereby increasing the frictional resistance to turning the screw within the stud sufficiently so that ordinary mechanical vibrations or an unintentional contact with the screw will not change its adjustment, and yet when adjustment is required it can be made without great difficulty, usually even without the use of a tool. The stud is split by forming one or more longitudinally extending saw cut slots 38 (Figs. 1, 3 and 4) therein, four being shown herein intersecting at 90° thereby dividing the sleeve into four slender somewhat elastic fingers 40. The constrictor is in the form of an elastic spring ring 42 (Fig. 5) which itself is split and is mounted on the exterior of the stud so as to squeeze the stud fingers 40 against the screw 14. The ring can be beryllium, copper or stainless steel. An annular groove 44 (Fig. 4) is formed in the surface of the stud fingers peripherally thereof, adjacent the end from which the screw extends for receiving the ring 42. The diameter of the stud at the bottom of the groove is greater than the inside diameter of the ring 42 so that when the latter is placed within the groove it must be expanded and hence tends to squeeze the stud fingers 40 against the screw. In a practical embodiment, the inside diameter of the unstressed ring is .094" and the outside diameter of the groove .100".

To facilitate placing the ring on the stud within the groove 44 the end portion 46 of the stud (Fig. 5) located between the groove and the end of the stud is tapered or beveled at 48. The beveled portion 48 tapers from a diameter greater than the diameter of the bottom of the groove, in the above example .110±.002" with a 30° taper, to a diameter slightly less than the inside diameter of the ring 42 so that it serves as a pilot to receive the ring and facilitate the forcing of the ring over it into the groove, which is quite important for easy assembly.

With the mount thus assembled, that is with the spindle 14 screwed into the stud 12 and with the spring ring 42 in the groove 44, the relative position of the assembly components, here coil 16 and core 18, can be adjusted, either prior to or after the mounting of the assembly on its support, hereby inserting the stud into the hole of pasnel P and by then fastening it with nut 26. The adjustment will not be affected by shock, vibration, or other accidental interference, due to the firm grip of the fingers 44 of the stud on the spindle, caused by the compression exerted by the spring ring 42.

As heretofore indicated it is not intended that this mount should be limited for use in adjusting the relative positions of the coil and the core of an inductor or of the electrodes of a capacitor. Assemblies with self-locking adjustment according to the present invention are useful wherever vibration or shockproof locking of an adjustable mounting, in the nature of a vibration-proof stop nut, is required. It will now be evident that the present invention provides the advantages of such stop nut arrangements while avoiding their draw-backs. Thus, the spring ring element 42 according to the invention never touches any male thread and therefore the adjusting threads involved in this construction are not subject to wear of a type that impairs the locking function. The assembly can be mounted or removed without affecting the relative position of the adjustable components (here core and coil) because the inside diameter of the mounting nut 26 exceeds the maximum diameter of the adjustable assembly proper. Any loose parts such as nuts or spring washers are eliminated from the adjustable assembly, which is an important consideration in production usage. A further advantage is the perfect accessibility of the adjusting portion 36 and the easy approach thereto with a simple and easily applied tool. Another of the various advantages is the possibility of using relatively cheap and easily machined material for the mounting stud 12 which represents the bulk of the assembly. Without use of the compression spring the mounting stud could provide the required compression only if the spring fingers were made from a special spring material such as beryllium copper which is difficult to machine and may require heat treatment. It will now be evident that the utilization of these features for the adjustable mounting of the components of a reactance device such as herein described, introduces advantages which are particularly valuable in embodiments of this type.

It should be understood that the present disclosure is for the purpose of illustration only and that this invention includes all modifications and equivalents which fall within the scope of the appended claims.

I claim:

1. An adjustable assembly comprising: a hollow metal stud having an essentially uniform internal thread through its entire length, having near one end means for securing it to a supporting structure, and at said end being adapted to carry a component of apparatus to be adjusted, and being split at the other end to form elastic fingers; a screw threaded through said stud to produce longitudinal adjusting movement between the stud and the screw upon rotation of the screw, said screw extending with both ends from the stud and being adapted to carry a second component of said apparatus on the end that extends at said securing means, and constrictor means applied around the outer ends of said fingers to compress the split portion of the stud into contact with said screw for substantially the length of said fingers, the resulting comparatively large area of pressurable contact thus providing considerable frictional torque which resists accidental rotation between the stud and the screw while permitting said longitudinal adjustment by rotating the screw from its free end.

2. An adjustable assembly comprising: a hollow metal stud having an essentially uniform internal thread through its entire length, having near one end means for securing it to a supporting structure, and at said end being adapted to carry a component of apparatus to be adjusted, and being split over a considerable length at the other end to form elastic fingers having at their outer ends an external peripheral groove; a screw threaded through said stud to produce longitudinal adjusting movement between the stud and the screw upon rotation of the screw, said screw extending with both ends from the stud and being adapted to carry a second component of said apparatus on the end that extends at said securing means; and a spring ring appreciably shorter than the length of said fingers mounted in said groove to compress the split portion of the stud into contact with said screw for substantially the length of said fingers, the resulting comparatively large area of pressurable contact thus providing considerable frictional torque which resists accidental rotation between the stud and the screw while permitting said longitudinal adjustment by rotating the screw.

3. An adjustable assembly comprising: a hollow metal stud having an essentially uniform internal thread through its entire length and being split at one end to form elastic fingers; a screw threaded through said stud to produce longitudinal adjusting movement between the stud and the screw upon rotation of the screw; constrictor means applied around the outer ends of said fingers to compress the split portion of the stud into contact with said screw for substantially the length of said fingers, the resulting comparatively large area of pressurable contact thus providing considerable frictional torque which resists accidental rotation between the stud and the screw while permitting said longitudinal adjustment by rotating the screw; and an external thread on said stud means beginning at said constrictor means, extending beyond the roots of said fingers, and having a diameter that is greater than that of any part on said split end of the stud including said constrictor means so that a threaded mounting means can be freely put on said external thread of the stud beyond the fingers.

References Cited in the file of this patent

UNITED STATES PATENTS

| | | |
|---|---|---|
| 2,424,604 | Dzus | July 29, 1947 |
| 2,502,202 | Burroughs | Mar. 28, 1950 |
| 2,555,923 | Elstad | June 5, 1951 |
| 2,581,165 | Bonanno | Jan. 1, 1952 |
| 2,782,385 | Collett | Feb. 19, 1957 |

FOREIGN PATENTS

| | | |
|---|---|---|
| 547,624 | Great Britain | Sept. 3, 1942 |